(12) United States Patent
Heuer et al.

(10) Patent No.: US 9,055,327 B2
(45) Date of Patent: Jun. 9, 2015

(54) SYSTEMS, DEVICES, AND METHODS FOR MANAGING CHANGES TO DATA

(75) Inventors: Jörg Heuer, Oberhaching (DE); Martin Winter, Rosenheim (DE)

(73) Assignee: NOKIA SIEMENS NETWORKS GMBH & CO., Munich (DE)

( * ) Notice: Subject to any disclaimer, the term of this patent is extended or adjusted under 35 U.S.C. 154(b) by 1547 days.

(21) Appl. No.: 12/281,040

(22) PCT Filed: Feb. 9, 2007

(86) PCT No.: PCT/EP2007/051268
§ 371 (c)(1),
(2), (4) Date: Mar. 17, 2011

(87) PCT Pub. No.: WO2007/096257
PCT Pub. Date: Aug. 30, 2007

(65) Prior Publication Data
US 2011/0162028 A1    Jun. 30, 2011

(30) Foreign Application Priority Data
Feb. 23, 2006   (DE) .......................... 10 2006 008 471

(51) Int. Cl.
*H04N 21/43*       (2011.01)
*H04N 21/434*      (2011.01)
*H04N 7/173*       (2011.01)
(Continued)

(52) U.S. Cl.
CPC ....... *H04N 21/4349* (2013.01); *H04N 7/17318* (2013.01); *H04N 21/26266* (2013.01); *H04N 21/26291* (2013.01); *H04N 21/4586* (2013.01); *H04N 21/8126* (2013.01)

(58) Field of Classification Search
USPC ................. 725/62, 59, 50, 144, 151
See application file for complete search history.

(56) References Cited

U.S. PATENT DOCUMENTS 5,844,620 A    12/1998 Coleman
6,681,395 B1 *  1/2004 Nishi .............................. 725/45
(Continued)

FOREIGN PATENT DOCUMENTS

DE    10312030    9/2004
EP    1383335     1/2004

OTHER PUBLICATIONS

DVB, "IP Datacast over DVB-H: Content Delivery Protocols (CDP)", Dec. 1, 2005, 72 pages, http://www.dvb-h-online.org/technology.htm.

(Continued)

*Primary Examiner* — Jun Fei Zhong
(74) *Attorney, Agent, or Firm* — Michael Haynes PLC; Michael N. Haynes

(57) ABSTRACT

Certain exemplary embodiments can provide and/or utilize a system, device, and/or method for managing changes to data, such as a method that includes transmitting a change to a static object (SO1) by means of a change object (SO*) in a data distribution service that communicates a plurality of static objects (SO1, . . . , SO5) via a carousel transmission (KUE) and real time data (RD) via a streaming transmission (SUE), wherein the change object (SO*) is formed on the basis of at least one information item (I*) to be changed and on the basis of at least one change rule (R*) specifying a procedure for carrying out the change, and the change object (SO*) is communicated via the streaming transmission (SUE).

22 Claims, 2 Drawing Sheets

(51) Int. Cl.
*H04N 21/262* (2011.01)
*H04N 21/458* (2011.01)
*H04N 21/81* (2011.01)

(56) References Cited

U.S. PATENT DOCUMENTS

| | | | |
|---|---|---|---|
| 7,065,780 B2 * | 6/2006 | Barbier et al. | 725/112 |
| 7,827,579 B2 * | 11/2010 | Saarikivi et al. | 725/59 |
| 2003/0030658 A1 | 2/2003 | Gibbs | |
| 2004/0010524 A1 * | 1/2004 | Wallace et al. | 707/205 |
| 2004/0031061 A1 | 2/2004 | McCalla | |
| 2005/0090235 A1 * | 4/2005 | Vermola et al. | 455/414.3 |
| 2006/0130099 A1 * | 6/2006 | Rooyen | 725/62 |

OTHER PUBLICATIONS

Kwon, "Object Acquiring Time Saving Scheme in Data Broadcasting", Jan. 1, 2005, pp. 409-410, International Conference on Consumer Electronics, ICCE Jan. 2005; IEEE.

Paila, "FLUTE—File Delivery Over Unidirectional Transport", Oct. 1, 2004, 35 pages, IETF.

* cited by examiner

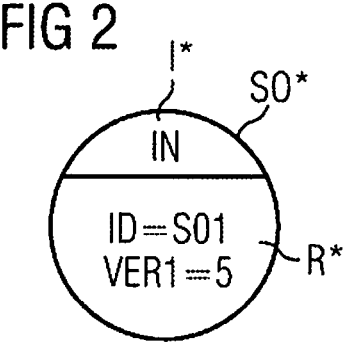
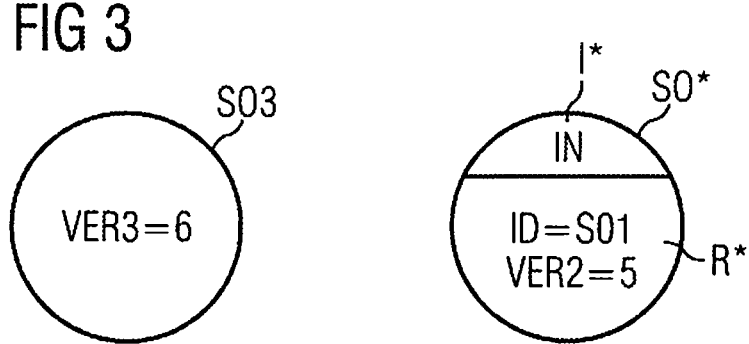
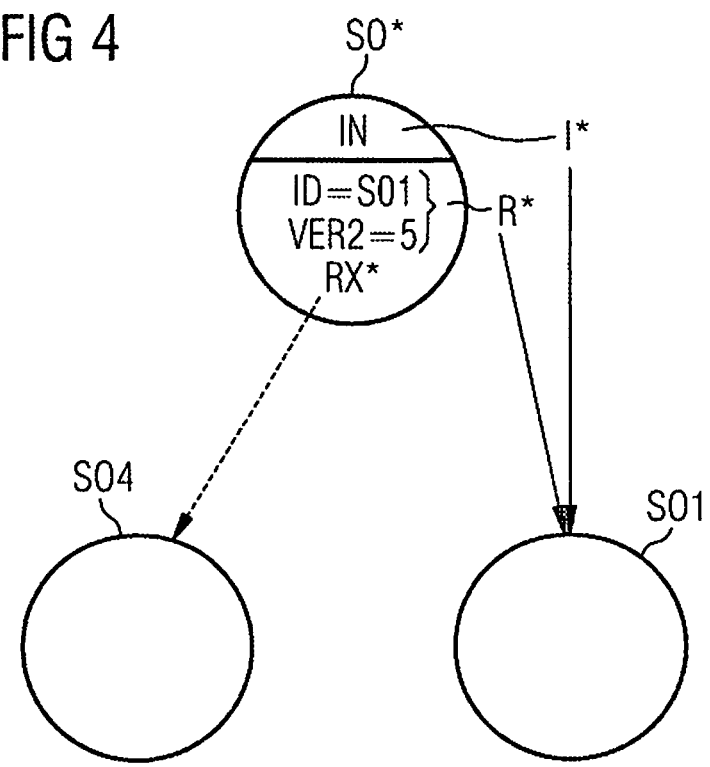

SYSTEMS, DEVICES, AND METHODS FOR MANAGING CHANGES TO DATA

CROSS-REFERENCES TO RELATED APPLICATIONS

This application is a United States National Stage entry of, claims priority to, and incorporates by reference herein in its entirety, International Application PCT/EP2007/051268, filed 2 Sep. 2007, which claims priority to German Application DE102006008471.3, filed 23 Feb. 2006.

BRIEF DESCRIPTION OF THE DRAWINGS

FIG. 2 shows a structure of a change object;

FIG. 3 shows a change to a static object depending on a further static object; and FIG. 4 shows a change to the static object and to a further static object depending on the change object.

Elements having an identical function and method of operation are provided with the same reference symbols in FIGS. 1 to 4.

DETAILED DESCRIPTION

Figure 1:
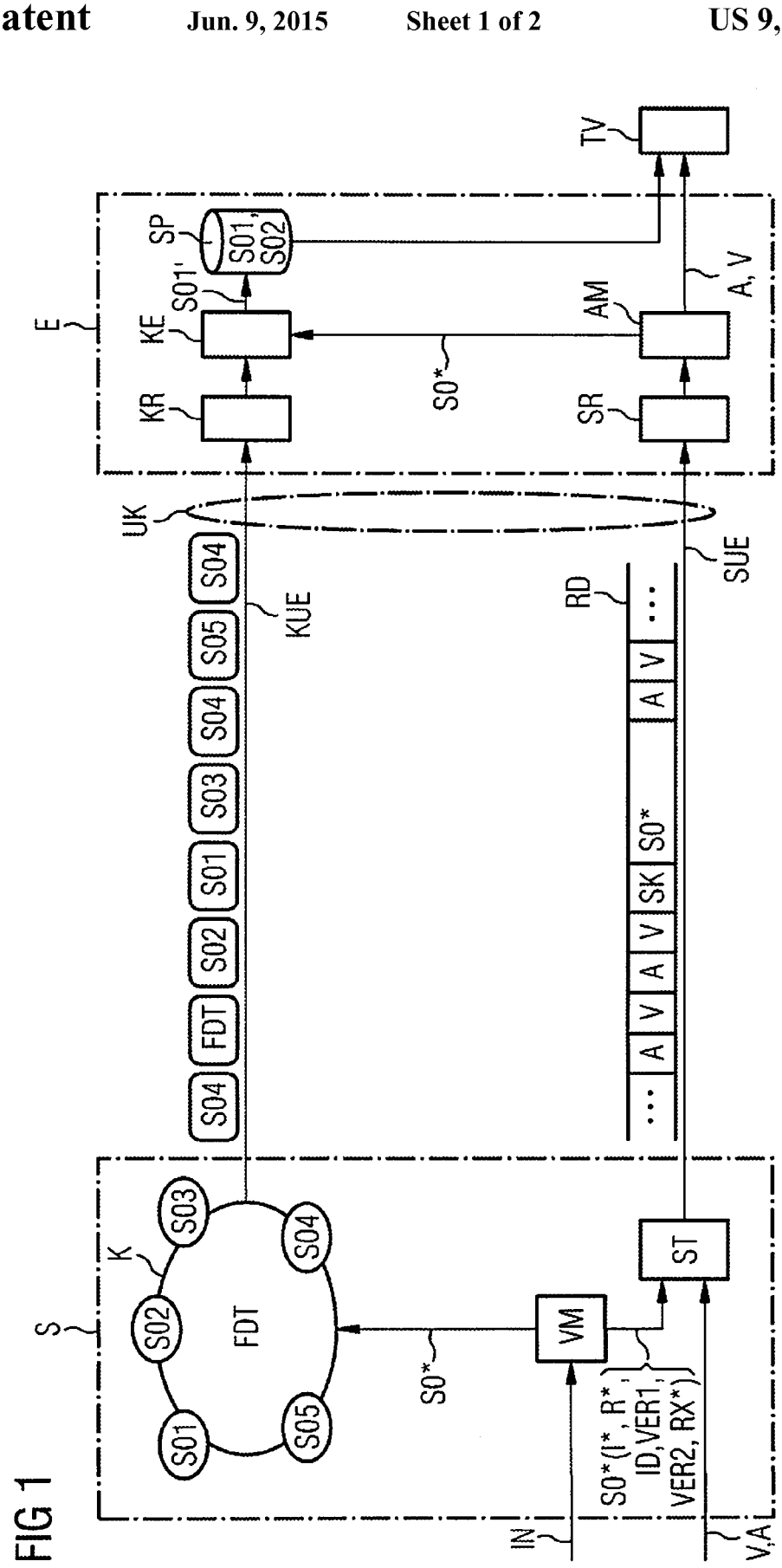
FIG. 1 shows an exemplary embodiment with a data distribution service, having a carousel transmission and a streaming transmission.

The invention relates to a method for transmission of a change to a static object by means of a change object in a data distribution service, and to a transmitter and a receiver.

In present-day information distribution services such as, for example, a broadcast system according to the DVB-T standard (DVB-T—Digital Video Broadcast Terrestrial), two types of data transmission are supported:

Carousel transmission: In this case, data are transmitted as static objects. Here the static objects are repeated from time to time and the static objects are transmitted in an order predetermined by a transmitter. The static objects to be transmitted are announced to a receiver with the aid of a transmission pattern. After reception, the static objects are buffer-stored for example for retrieval by a user. In the case of DVB-T, an electronic program guide (EPG) and teletex pages are communicated by means of the carousel transmission.

Streaming transmission: In this case, usually audiovisual data in real time, i.e. real time data, are transmitted to the receiver. Said real time data are output for example on a user's television without a long temporal delay.

In the case of carousel transmission, static objects are communicated taking account of the transmission pattern. It is found here, however, that after the transmission pattern has been defined, it is not possible to give preference to currently important static objects during the transmission, since a new static object first has to be announced by means of the transmission pattern. This results in a long reaction time. It is furthermore disadvantageous that the receiver has to permanently scan the carousel transmission for new transmission patterns.

An improvement in this respect can be achieved with the aid of an announcement channel. The announcement channel notifies the receiver that a change to the transmission pattern of the carousel will take place for a specific carousel transmission. This approach does not improve the reaction time, however, since a receiver, triggered by the announcement channel, firstly has to wait for the new transmission pattern of the announced carousel transmission to be changed, in order then to be able to filter out the required static object from the carousel transmission.

In another known embodiment, a static object is transmitted to the receiver. In the receiver, said static object is buffer-stored in such a way that it is initially not evaluated. On the basis of an advisory signal in the streaming transmission, for the static object transmitted beforehand, the receiver is notified that the static object can be evaluated, for example by a change to another static object. What is advantageous in this variant is that the static object is used only at a time triggered by the advisory signal. However, the static object has to be transmitted to the receiver beforehand, such that current information, such as brand new messages, cannot thereby be transmitted in real time.

In the context of this description, currently important data or information should be understood to mean contents which are intended to be created at the present point in time and transmitted to the receiver in real time. What can be understood as an example of currently important data is a teletext page that makes available to the user in real time, with regard to a football match, current information such as score, time of individual goals and names of the football players currently on the pitch. Furthermore, important data can also comprise an Electronic Service Guide (ESG) having current service offers or an updated scene description of a multimedia presentation, in which case the scene description can be realized for example in accordance with an LASeR standard (LASeR—Lightweight Application Scene Representation).

Consequently, the object is to specify a method and also a transmitter and a receiver which make it possible to transmit a change to a static object in a data distribution service with a short delay time in a simple manner.

This object is achieved by means of the independent claims. Other developments of the invention are represented in the dependent claims.

In a method for transmission of a change to a static object by means of a change object in a data distribution service which communicates static objects by means of a carousel transmission and real time data by means of a streaming transmission, the change object is formed on the basis of at least one information item to be changed and on the basis of at least one change rule specifying a procedure for carrying out the change, and the change object is communicated by means of the streaming transmission.

The change to the static object with the aid of the change object is thereby imparted in compact form. Furthermore, fast communication of the change object from a transmitter to a receiver is ensured on the basis of the streaming transmission. Furthermore, the method can easily be integrated into existing data distribution services since the change object is rejected at a receiver which cannot interpret it.

Furthermore, if the change object is filtered out of the streaming transmission and the static object to be changed is changed into the changed static object on the basis of the change object, then a receiver can easily evaluate the change object and, for example, also implement the change to be carried out.

Preferably, the static object to be changed is selected on the basis of an identification indication comprising the change rule. The static object to be evaluated or to be altered can thereby be selected in a simple manner. Furthermore, if a first version number comprising the change rule is entered into the static object to be changed, then changed static objects can be differentiated from non-changed static objects in a simple manner.

Preferably, a time indication comprising the change rule is entered into the change object, the time indication specifying a time for carrying out the change rule. It is thereby possible to determine an implementation time of the change rule. Furthermore, when the static object to be changed is received at different receivers at respectively different times, it is possible for the change rule to be carried out in a temporally synchronized manner in the receivers.

Furthermore, preferably, the change to the static object to be changed is carried out on the basis of at least one second version number comprising the change rule if a further version number of a further static object has a value greater than or equal to the second version number. It is thereby possible to take account of the fact that a change is carried out only if the further version number is greater than or equal to the second version number.

If a further static object is changed on the basis of at least one additional change rule in the change object then more than one static object can be changed with the aid of a single change object. This procedure is expedient particularly for the case where further static objects have to be changed as a result of the change to the static object.

Preferably, in a transmitter, the static object to be changed is changed into the changed static object on the basis of the change object, and at least the changed static object is communicated via the carousel transmission. It is ensured in this case that the at least one changed static object reaches the receiver even in the case of erroneous communication of the change object via the streaming transmission. Furthermore, what this extension allows is that a receiver that has started to receive data via the streaming transmission only after the transmission of the change object acquires knowledge of the change to the at least one static object.

In one preferred extension, prior to transmission, the change object is protected by means of an error protection method for reducing transmission errors. It is thereby possible to reduce a proportion of erroneously transmitted change objects.

The invention also relates to a transmitter in a data distribution service, the transmitter communicating static objects by means of a carousel transmission and real time data by means of a streaming transmission, wherein a first processing module is configured for forming a change object, the change object comprising an indication of an information item to be changed and a change rule specifying a procedure for carrying out the change, and a streaming transmission module is configured for transmitting the change object by means of the streaming transmission. With the aid of the transmitter, the method for transmission of a change to a static object can be realized at the transmitter end.

Preferably, the first processing module is configured for forming the change object, the change object additionally comprising at least one of the following indications:
 a. a first version number for entering into the static object to be changed;
 b. a second version number, the change to the static object to be changed being carried out if a further version number of a further static object has a value greater than or equal to the second version number;
 c. at least one additional change rule, for changing a further static object;
 d. a time indication comprising the change rule, the time indication specifying a time for carrying out the change rule.

This defines variants in the formation of the change object which can be used to specify a specific procedure for carrying out the change.

Preferably, the first processing module is configured for changing the static object to be changed into the changed static object on the basis of the change object and for forwarding at least the changed static object to a carousel, and the carousel is configured for communicating at least the changed static object to the receiver via the carousel transmission. This is advantageous since the receiver can be notified of the change in addition to the change object also with the aid of the changed static object via the carousel transmission.

The invention furthermore relates to a receiver in a data distribution service, the receiver receiving static objects by means of a carousel transmission and real time data by means of a streaming transmission, wherein a selection means is configured for separating the real time data and a change object received from the streaming transmission, and a carousel processing means is configured for evaluating the change object on the basis of at least one information item to be changed and comprising the change object, and a change rule. The receiver makes it possible to realize the method for transmission of a change to a static object at the receiver end.

Preferably, the carousel processing means is configured for changing the static object to be changed into the changed static object on the basis of the change object, whereby the change can be realized.

In one preferred extension, the carousel processing means is configured for changing the at least one static object additionally on the basis of one of the following instructions:
 a. selecting the static object to be changed on the basis of an identification indication comprising the change rule;
 b. entering a first version number comprising the change rule into the static object to be changed;
 c. carrying out the change to the static object to be changed on the basis of at least one second version number comprising the change rule if a further version number of a further static object has a value greater than or equal to the second version number;
 d. changing a further static object on the basis of at least one additional change rule in the change object;
 e. changing the static object to be changed on the basis of the change object received via the carousel transmission;
 f. implementing the change rule with respect to a time indication comprising the change rule.

This defines variants in the formation of the change object which can be used to specify a specific procedure for carrying out the change.

Preferably, a selection means is configured for correcting errors that occur on account of an erroneous streaming transmission on the basis of an error protection method. It is thereby possible to reduce a proportion of erroneously transmitted change objects.

The invention and its developments are explained in more detail with reference to the drawing, in which:

A first exemplary embodiment is explained in more detail with reference to FIG. 1. FIG. 1 shows a system comprising a transmitter S, a receiver E and a transmission channel UK. The transmitter S realizes a distribution of data in a data distribution service. The data distribution service operates e.g. according to the DVB-T standard. The transmitter can be realized as a server in a provider network. The data of the data distribution service are transmitted in a wire-based manner, e.g. via the internet according to the IP standard (IP—Internet Protocol), or in wireless fashion, e.g. according to the GSM standard (GSM—Global System for Mobile Communications) or according to the DVB-IPDC Standard[1] (IPDC—Internet Protocol Data Cast). The receiver can be configured in the form of a set-top box connected to a reproduction device, in particular a television set. In one variant in this respect, the receiver can be integrated in a portable device, e.g. a laptop or mobile telephone.

In the present exemplary embodiment, teletext pages are intended to be communicated recurrently to the receiver. For this purpose, the teletext pages are organized as static objects S0, ..., S5 by means of a carousel K in the transmitter and are transmitted. The static objects are announced to the receiver in accordance with a transmission pattern FDT. This type of transmission is referred to hereinafter as carousel transmission KUE. [2] describes a protocol used to effect transmission of static objects and a transmission pattern via UDP/IP. (UDP—User Datagram Protocol).

The static objects are sent to a carousel reception module KR of the receiver, which forwards the received static objects to a carousel processing means KE. Said carousel processing means checks whether the received static objects have to be evaluated. Furthermore, the static objects can be stored in an organized manner before or after evaluation in a memory module SP. In this case, evaluation should be understood to mean that received static objects are analyzed and, if appropriate, inserted into existing stored static objects and/or references between the static objects are adapted on the basis of the received static objects. One or a plurality of static objects are output on a user's television TV automatically or on request.

In parallel with the communication of static objects via the carousel transmission, real time data RD such as e.g. video signals V and audio signals A coded according to the MEPG-2 standard, are communicated from the transmitter S to the receiver E. For this purpose the audio and video signals are forwarded to a streaming transmission module ST, which transmits said signals, after optional transmission-specific conditioning, to a streaming reception module SR in the receiver, where, after optional transmission-specific conditioning, the video and audio signals are forwarded via a selection means AM to the television TV for reproduction. In this case, the transmission is effected as a streaming transmission SUE since the real time data RD are sent in real time successively to the receiver.

If a current information item IN, e.g. a newsflash about a sports result, is intended to be transmitted to the receiver, then it is transferred to a processing module VM. The latter generates from this a change object SO*, which is passed to the streaming transmission module. The streaming transmission module inserts the change object SO* between the audio and video signals for transmission. By way of example, the audio and video signals are in each case transmitted by means of a specific RTP/UDP/IP transport format (RTP—Realtime Transport Protocol). The change object SO* is packed in a specific RTP/UDP/IP transport format and sent in this way from the streaming transmission module ST to the streaming reception module SR. The streaming reception module forwards the received data to the selection means, which, in the case of identifying the change object SO*, forwards the latter to the carousel processing means KE, where the received change object SO* is evaluated and, on the basis of this change object, a change of at least one static object SO1 stored e.g. in the memory module into the changed static object SO1' is carried out. In an alternative to this, the change object can describe a new static object, an evaluation being carried out to the effect that an empty, unused or new static object is changed or generated and initialized by means of the change object. The changed static object SO1' is stored in the memory module SP and can immediately be reproduced on the user's television TV.

FIG. 2 illustrates an embodiment of the change object SO*. In this case, the current message IN as information I* to be changed and a procedure for carrying out the change as change rule R* are stored in the change object SO*. The information I* to be changed comprises a text message, for example, which is intended to be output on a teletext page. The change rule R* describes at least the static object SO1 to be changed, e.g. in the form of an identification mark, in the form of a memory address in the memory module from which the static object to be changed can be found, or as an index in a list which refers to the static object to be changed. In the example in accordance with FIG. 2, the static object SO1 with the information I* to be changed is intended to be changed, in which case, after the change, a version number of the static object to be changed is set to a value of a first version number VER1=5. This first version number VER1 is likewise conveyed in the change rule R*. A validity of the individual static objects can be managed with the aid of the respective version number.

In a further embodiment of the invention, which is explained with reference to FIG. 3, a change to the static object to be changed is intended to be effected if a value of a version number VER3 of a further static object is equal to a value of a second version number VER2 communicated with the change rule. As can be gathered from FIG. 3, the version number of the static object SO3 is VER3=6. Since VER3>VER2, the change is not performed. In an alternative development, the change, prescribed by the change object SO*, is only performed when the version number VER3 corresponds to and/or is greater than the value of the second version number.

A further, practically expedient configuration of the invention can be seen in FIG. 4. In this case, the change object SO* specifies the information I* to be changed and the change rule R* for the static object SO1. On the other hand, the change object SO* comprises an additional change rule RX*, which presents a further change to be carried out, e.g. an adaptation of references between the static objects. Particularly if a new static object is formed by means of the static object to be changed, a change to references between the respective static objects may become necessary. In FIG. 4, the information I* to be changed and the change rule R* relate to the static object SO1 and the additional change rule RX* relates to the static object SO4. These dependencies are indicated symbolically by arrows.

In one development of the invention, the change object is protected prior to transmission by means of an error protection method FEC for reducing transmission errors. This can be effected by means of a forward error correction method, e.g. by means of a Reed-Solomon code. The change object is provided with error protection e.g. in the processing module VM. In the selection means of the receiver it is possible to correct the errors on account of an erroneous streaming transmission on the basis of the error protection. Further error protection methods are known to the person skilled in the art, and so they are not discussed any further here.

Furthermore, the change rule can contain a time indication T specifying the time at which the change rule R*, RX* is to be carried out.

The change object can be transmitted to the receiver in real time with the aid of the streaming transmission. During the streaming transmission, errors can occur in such a way that the change object is received in unusable fashion in the receiver. Therefore, it is expedient in practice, in a transmitter, to change the static object SO1 to be changed into the changed static object SO1' on the basis of the change object SO* and subsequently to send at least the changed static object SO1' via the carousel transmission. What is thus achieved is that a change, in the case where a receiver has not received the change on account of an erroneous transmission of the change object via the streaming transmission, can additionally be received via the carousel transmission and evaluated. If the change object has already been received and processed, then the changed static object SO1' received by means of the carousel transmission is not evaluated further. This increases a security in the transmission of change objects. If a plurality of static objects are changed on the basis of the change object in the transmitter, then—in particular all of—the static changed objects are transmitted via the carousel transmission.

BIBLIOGRAPHY

DVB-IPDC, "IP Datacast over DVB-H: Content Delivery Protocols (CDP)", http://www.dvb-h-online.org/technology.htm T. Paila et al., "FLUTE—File Delivery over Unidirectional Transport", RFC 3926, IETF, October 2004, http://www.ietf.org

What is claimed is:

1. A method comprising:
in a data distribution service that communicates a plurality of static objects (SO1, . . . , SO5) via a carousel transmission (KUE) and communicates real time data (RD) via a streaming transmission (SUE),
transmitting a change object (SO*) that defines how to change a static object (SO1) in the plurality of static objects (SO1, . . . , SO5) to a changed static object (SO1'), wherein:
the change object (SO*) comprises an indication of at least one information item (I*) to be changed in the static object (SO1) and comprises at least one explicit change rule (R*) that specifies a procedure for changing the static object (SO1) to the changed static object (SO1'), and
the change object (SO*) is communicated in real time with the aid of the streaming transmission (SUE); and
wherein the change object (SO*) is filtered out of the streaming transmission (SUE), and the static object (SO1) to be changed is changed into the changed static object (SO1') on the basis of the change object (SO*) without the changed static object (SO1') being transmitted via the carousel transmission (KUE).

2. The method of claim 1, wherein:
the static object (SO1) to be changed is selected on the basis of an identification indication (ID) comprised in the at least one explicit change rule (R*).

3. The method of claim 1, wherein:
a first version number (VER1) comprised in the at least one explicit change rule (R*) is entered into the static object (SO1) to be changed.

4. The method of claim 1, wherein:
a time indication (T) comprised in the at least one explicit change rule (R*) is entered into the change object (SO*), the time indication (T) specifying a time for carrying out the at least one explicit change rule (R*).

5. The method of claim 1, wherein:
the static object (SO1) is changed on the basis of at least one predetermined version number (VER2) comprised in the at least one explicit change rule (R*) if a further version number (VER3) of a further static object (SO3) has a value greater than or equal to the at least one predetermined version number (VER2).

6. The method of claim 1, wherein:
a further static object (SO4) is changed on the basis of at least one additional explicit change rule (RX*) in the change object (SO*).

7. The method of claim 1, wherein:
in a transmitter, the static object (SO1) to be changed is changed into the changed static object (SO1') on the basis of the change object (SO*), at least the changed static object (SO1') is communicated via the carousel transmission (KUE).

8. The method of claim 1, wherein:
prior to transmission, the change object (SO*) is protected via an error protection method for reducing transmission errors.

9. The method of claim 1, wherein:
the change object (SO*) comprises an explicit time indication (T) that specifies a specific point in time for carrying out the at least one explicit change rule (R*).

10. A transmitter (S) in a data distribution service, the transmitter configured for communicating a plurality of static objects (SO1, . . . , SO5) by means of a carousel transmission (KUE) and real time data (RD) via a streaming transmission (SUE), wherein:
the transmitter is configured for forming a change object (SO*), the change object (SO*) comprising an indication of an information item (I*) to be changed and an explicit change rule (R*) specifying a procedure for carrying out a change of a static object (SO1) of the plurality of static objects (SO1, . . . , SO5) to the changed static object (SO1'); and
the transmitter is configured for transmitting the change object (SO*) via the streaming transmission (SUE); and
wherein the procedure for carrying out the change of the static object (SO1) of the plurality of static objects (SO1, . . . , SO5) to the changed static object (SO1') enables the static object (SO1) to be changed at a receiver (E) into the changed static object (SO1') on the basis of the change object (SO*) without the changed static object (SO1') being transmitted to the receiver (E) via the carousel transmission (KUE).

11. The transmitter (S) of claim 10, wherein:
the transmitter is configured for forming the change object (SO*), the change object (SO*) additionally comprising at least one of the following indications:
a first version number (VER1) configured for entering into the static object (SO1) to be changed;
a second version number (VER2), the change to the static object (SO1) to be changed being carried out if a further version number (VER3) of a further static object (SO3) has a value greater than or equal to the second version number (VER2);
at least one additional explicit change rule (RX*), configured for changing a further static object (SO4);
a time indication (T) comprised in the explicit change rule (R*), the time indication (T) configured for specifying a time for carrying out the explicit change rule (R*).

12. The transmitter (S) of claim 10, wherein:
the transmitter is configured for changing the static object (SO1) to be changed into the changed static object (SO1') on the basis of the change object (SO*) and for forwarding at least the changed static object (SO1') to a carousel (K), the carousel (K) configured for communicating at least the changed static object (SO1') to the receiver (E) via the carousel transmission (KUE).

13. The transmitter (S) of claim 10, wherein:
the change object (SO*) comprises an explicit time indication (T) that specifies a specific point in time for carrying out the at least one explicit change rule (R*).

14. A receiver (E) in a data distribution service, the receiver configured for: receiving a plurality of static objects (SO1, . . . , SO5) via a carousel transmission (KUE); and receiving real time data (RD) and a change object (SO*) via a streaming transmission (SUE), wherein:
- a selector (AM) is configured for separating the real time data (RD) and the change object (SO*) received from the streaming transmission (SUE);
- a carousel processor (KE) is configured for evaluating the change object (SO*) on the basis of at least one information item (I*) to be changed and change rule (R*), the change rule (R*) specifying a procedure for carrying out a change of a static object (SO1) in the plurality of static objects (SO1, . . . , SO5) to a changed static object (SO1') without the changed static object (SO1') being received via the carousel transmission (KUE), the change object (SO*) comprising the at least one information item (I*) and the change rule (R*);
- the receiver (E) is further configured to additionally receive the changed static object (SO1') via the carousel transmission (KUE); and
- wherein the carousel processor (KE) is configured for changing the static object (SO1) to be changed into the changed static object (SO1') on the basis of the change object (SO*).

15. The receiver (E) of claim 14, wherein:
the carousel processor (KE) is configured for changing the at least one static object (SO1) additionally on the basis of selecting the static object (SO1) to be changed on the basis of an identification indication (ID) comprised in the change rule (R*).

16. The receiver (E) of claim 14, wherein:
said selector (AM) is configured for correcting errors that occur on account of an erroneous streaming transmission (SUE) on the basis of an error protection method.

17. The receiver (E) of claim 14, wherein:
the carousel processor (KE) is configured for changing the at least one static object (SO1) additionally on the basis of entering a first version number (VER1) comprised in the change rule (R*) into the static object (SO1) to be changed.

18. The receiver (E) of claim 14, wherein:
the carousel processor (KE) is configured for changing the at least one static object (SO1) to be changed on the basis of at least one predetermined version number (VER2) comprised in the change rule (R*) if a further version number (VER3) of a further static object (SO3) has a value greater than or equal to the at least one predetermined version number (VER2).

19. The receiver (E) of claim 14, wherein:
the carousel processor (KE) is configured for changing the at least one static object (SO1) additionally on the basis of changing a further static object (SO4) on the basis of at least one additional change rule (RX*) in the change object (SO*).

20. The receiver (E) of claim 14, wherein:
the carousel processor (KE) is configured for changing the at least one static object (SO1) additionally on the basis of implementing the change rule (R*) with respect to a time indication (T) comprised in the change rule (R*).

21. The receiver (E) of claim 14, wherein:
the change object (SO*) comprises an explicit time indication (T) that specifies a specific point in time for carrying out the at least one explicit change rule (R*).

22. The receiver (E) of claim 14, wherein:
the change rule (R*) is an explicit change rule.

* * * * *